(12) United States Patent
Baron et al.

(10) Patent No.: US 6,266,063 B1
(45) Date of Patent: Jul. 24, 2001

(54) REAL-TIME THREE-DIMENSIONAL WEATHER DISPLAY METHOD AND WEATHERCAST SYSTEM

(75) Inventors: Robert O. Baron; Gregory S. Wilson, both of Huntsville; Ronald J. Phillips, Madison; Tom S. Thompson, Athens; Brian Patrick Davis, Huntsville, all of AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

(21) Appl. No.: 09/174,213

(22) Filed: Oct. 16, 1998

Related U.S. Application Data
(60) Provisional application No. 60/062,588, filed on Oct. 20, 1997.

(51) Int. Cl.⁷ .................................................... G06F 15/00
(52) U.S. Cl. .............................................................. 345/419
(58) Field of Search .................................... 345/418, 419, 345/420, 113, 114, 473, 474, 475; 381/909.1

(56) References Cited

U.S. PATENT DOCUMENTS

| | | |
|---|---|---|
| 4,873,781 | 10/1989 | Nelson et al. . |
| 5,135,397 | 8/1992 | Yen . |
| 5,239,623 | 8/1993 | Sato et al. . |
| 5,255,190 | 10/1993 | Sznaider . |
| 5,262,773 | 11/1993 | Gordon . |
| 5,262,782 | 11/1993 | Rubin et al. . |
| 5,281,815 | 1/1994 | Even-Tov . |
| 5,317,689 | 5/1994 | Nack et al. . |
| 5,339,085 | 8/1994 | Katoh et al. . |
| 5,351,045 | * 9/1994 | Corman .................................. 342/26 |
| 5,363,475 | 11/1994 | Baker et al. . |
| 5,379,215 | 1/1995 | Kruhoeffer et al. . |
| 5,523,759 | 6/1996 | Gillberg et al. . |
| 5,583,972 | 12/1996 | Miller . |
| 5,598,359 | 1/1997 | Montag et al. . |
| 5,630,718 | 5/1997 | Montag et al. . |
| 5,648,782 | 7/1997 | Albo et al. . |
| 5,717,589 | 2/1998 | Thompson et al. . |

* cited by examiner

Primary Examiner—Phu K. Nguyen
(74) Attorney, Agent, or Firm—Lanier Ford Shaver & Payne, P.C.; David L. Berdan

(57) ABSTRACT

A method of graphically displaying weather data in real-time is disclosed. A plurality of subsets of weather data defining a detectable volume of a weather event affecting a geographic area are received over a period of time. Each of the subsets defines a volumetric portion of the weather event, and each subset is processed as it is received to create a plurality of components, each corresponding to a particular volumetric portion of the weather event. Each component is associated with a graphical representation of the affected geographic area as each component becomes available to create a then current three-dimensional model of the detectable volume of the weather event. A graphical representation of the then current three-dimensional model may be displayed during the associating step such that a viewer can observe the graphical representation changing a component at a time over the period of time. A system for graphically displaying weather data in real-time is also disclosed.

19 Claims, 4 Drawing Sheets

REAL-TIME THREE-DIMENSIONAL WEATHER DISPLAY METHOD AND WEATHERCAST SYSTEM

This application claims the priority date of U.S. Provisional Patent Application No. 60/062,588 filed on Oct. 20, 1997 and entitled "Method and Hardware System for Collecting and Displaying Weather-Related Data," the disclosure of which is hereby incorporated by reference.

BACKGROUND OF THE INVENTION

This invention relates generally to weather broadcasting and display systems, and more particularly to a three-dimensional weather display and weathercast system utilizing real-time three-dimensional representations of meteorological data including radar gathered data combined with geographical data for television broadcasts of simulated weather patterns in three dimensions.

BRIEF DESCRIPTION OF THE PRIOR ART

For many years people have relied on weather broadcasts to help plan their lives. According to Robert Henson in his book, *Television Weathercasting: A History*, weather "consistently ranks as the top draw in both local and national news (when featured in the latter)." According to a poll conducted by the National Oceanic and Atmospheric Administration in 1980, weather was "the major reason that people watch the news programs."

The field of meteorology has seen significant technological advances in the past few years. New and innovative devices such as Doppler radar, thunderstorm detectors, and wind and temperature profilers have all helped meteorologists better understand and predict weather.

However, despite public interest and technological advances, the weather display seen by television viewers has not changed significantly over the years. In nearly all television broadcasts, weather data is presented as a flat, 2-D (two-dimensional) map overlay. In the mid 1970's, "color-radar" was introduced, which differentiates areas of precipitation using a color-coding scheme. Patches of heavy rain, snow or hail are all depicted the same way: in red. Lighter areas of precipitation are represented in varying shades of yellow, green or blue.

The typical current weathercast display represents the weather symbolically rather than realistically and usually only shows the general air temperature and the location of precipitation. In some instances, a superimposed satellite display of fluffy cloud patterns is shown moving along over the flat map from an exaggerated height observation point. The "blue screen" display behind the announcer still usually shows the familiar two-dimensional patchwork rainfall amounts in red, yellow, green and blue. The satellite imagery displayed on the evening broadcast may be anywhere from a half-hour to four hours old.

Also significant is the information that is absent from the conventional weathercast display, such as: (1) the type of precipitation, (2) the strength and location of wind shear, (3) the presence of tornadic signatures showing rapid circular motion, (4) the location of updraft vault, (5) the location of wall clouds, (6) the location of heavy lightning activity, and (7) the wind direction on the ground.

The National Weather Service has a network of advanced S-Band radar stations in place at 138 sites in the United States, and is capable of delivering 77 different products to government meteorologists. These products include; winds aloft, lightning activity and wind shear conditions, such as microburst activity. However, of these 77 products, only 11 are commercially available through contract with several private weather service companies which act as intermediaries between the National Weather Service and the public. These companies charge for the use of these eleven products and, in order to receive the latest radar (NEXRAD) information from a particular site, a private individual or company pays a monthly fee to receive the radar signal.

There are several patents, which disclose various systems of three-dimensional representation of topographical data and meteorological data for pilots and flight simulators used in pilot training.

Manelphe, U.S. Pat. No. 5,077,609 discloses an optoelectric system of assistance in attack and navigational missions which provides a three-dimensional localization of a point of interest for a navigational resetting operation or for a firing control operation.

Yen, U.S. Pat. No. 5,135,397 discloses a 3-D weather simulation system used with a four-channel digital radar landmass simulator (DRLMS) for flight simulators which integrates culture, elevation, aspect, and weather. Weather maps can be loaded into the system as weather patterns and can be expanded, rotated, and translated. Weather mass is simulated in three dimensions, i.e., having a bottom and height. Implementation entails the full or partial occupation of terrain and targets by weather, and vice versa.

U.S. Pat. No. 5,583,972 issued to Miller describes a weathercasting system for displaying weather radar information in 3D, such that the viewer can simulate moving through the system to visualize the effects of a weather system at various geographical locations. Miller allows for the combination of data from multiple weather sources, but states that his weather images will be at least 20 minutes old by the time they are broadcast. This time delay is due in large part to the variety of weather data sources utilized by Miller, which cause delays both in receiving and assimilating the information.

The present invention is distinguished over the prior art in general, and these patents in particular by providing a weather-casting system for displaying dynamic real time three-dimensional pictorial representations of weather conditions created from meteorological data combined with geographical data. Meteorological data including precipitation, cloud cover data, the bottom and top of cloud formations, and reflectivity and velocity of rain droplets in real-time are acquired from C-band Doppler radar, which is combined with NEXRAD data, and the data is digitized and processed to produce a simulated, graphically displayable three-dimensional image of the meteorological data. The meteorological data is combined with the geographical data and displayed on a computer display screen, and manipulated by peripheral devices connected with the computer. The combined data is displayed as a three-dimensional graphical representation of weather conditions relative to a selective geographical area. The graphical representation can be manipulated to allow the viewer to visualize the effects of the weather system at various geographical locations, and from various angles. The graphical representation will also provide full volumetric data of the storm, allowing the user to "slice" the storm to view cross sections from various angles, and from various positions, including viewing the storm and a cross section from within the storm itself.

One problem associated with combining NEXRAD data with real-time Doppler radar data is the time delay.

NEXRAD data is typically updated only once every five or six minutes, whereas TV station Doppler radar data is practically instantaneous. If the user is to present a full 3D volumetric model of a storm system, then the model would need to be at least six minutes old to make use of the NEXRAD data. However, the present invention provides means for utilizing all of the NEXRAD data as it is available to match the real-time Doppler radar data. The NEXRAD data combined with the real-time Doppler radar provides an approximation of the entire volumetric data of the storm in real time.

SUMMARY OF THE INVENTION

It is therefore an object of the present invention to provide a 3-D weather display system utilizing real-time, three-dimensional representations of combined meteorological data including Doppler radar data and NEXRAD data for television broadcasts of simulated weather patterns.

It is another object of this invention to provide a 3D weather display system, wherein NEXRAD data is extrapolated forward in time for combination with real-time Doppler radar data. The combined data is then used to provide an approximation of real-time weather data in full volumetric 3D display.

DESCRIPTION OF THE PREFERRED EMBODIMENT

Figure 1:
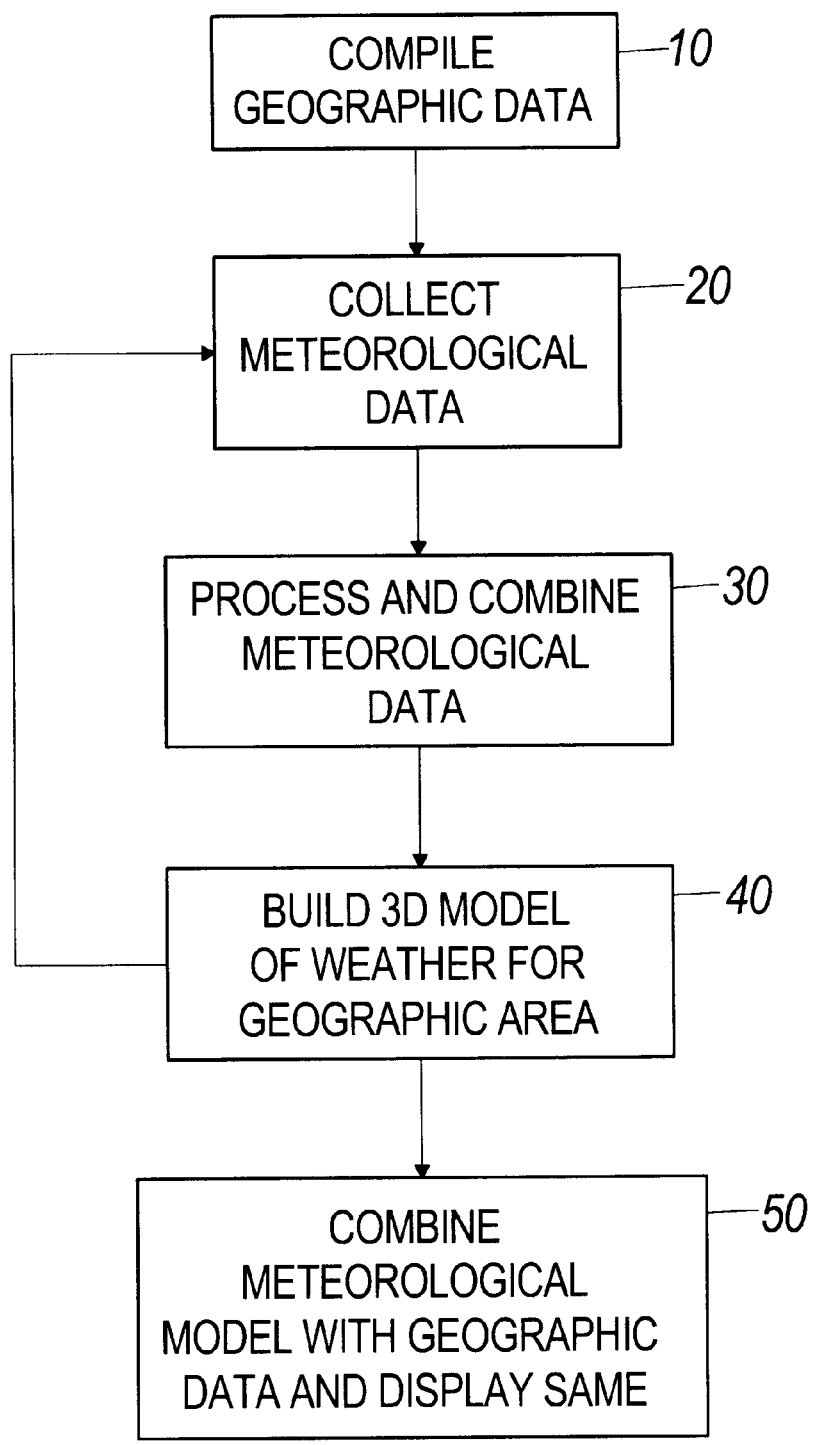
FIG. 1 is a block diagram illustrating the basic stages of the present invention for collecting and displaying weather data.
Figure 2:
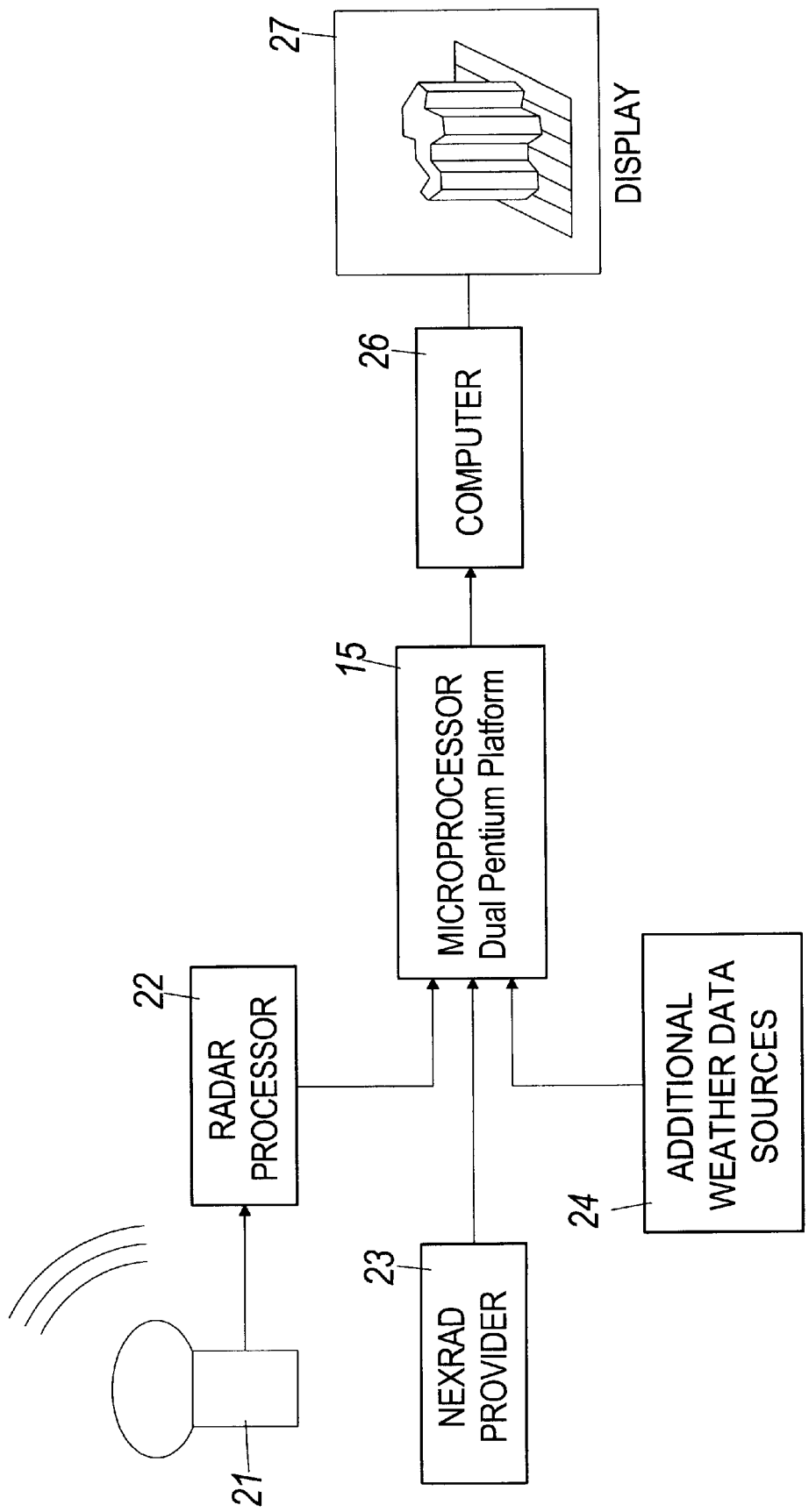
FIG. 2 is a schematic of the major components of the system of the present invention.
Figure 3:
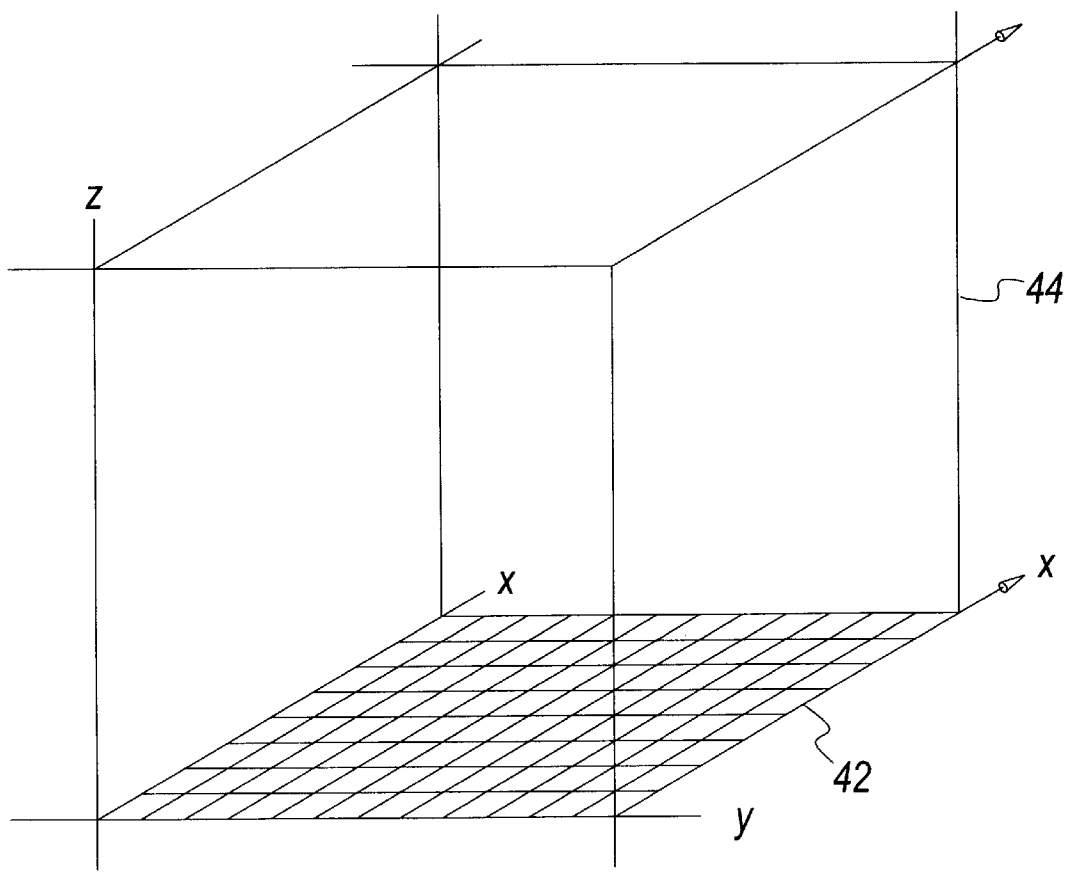
FIG. 3 is an illustration of a typical three-dimensional area that is the subject of the present invention.
Figure 4:
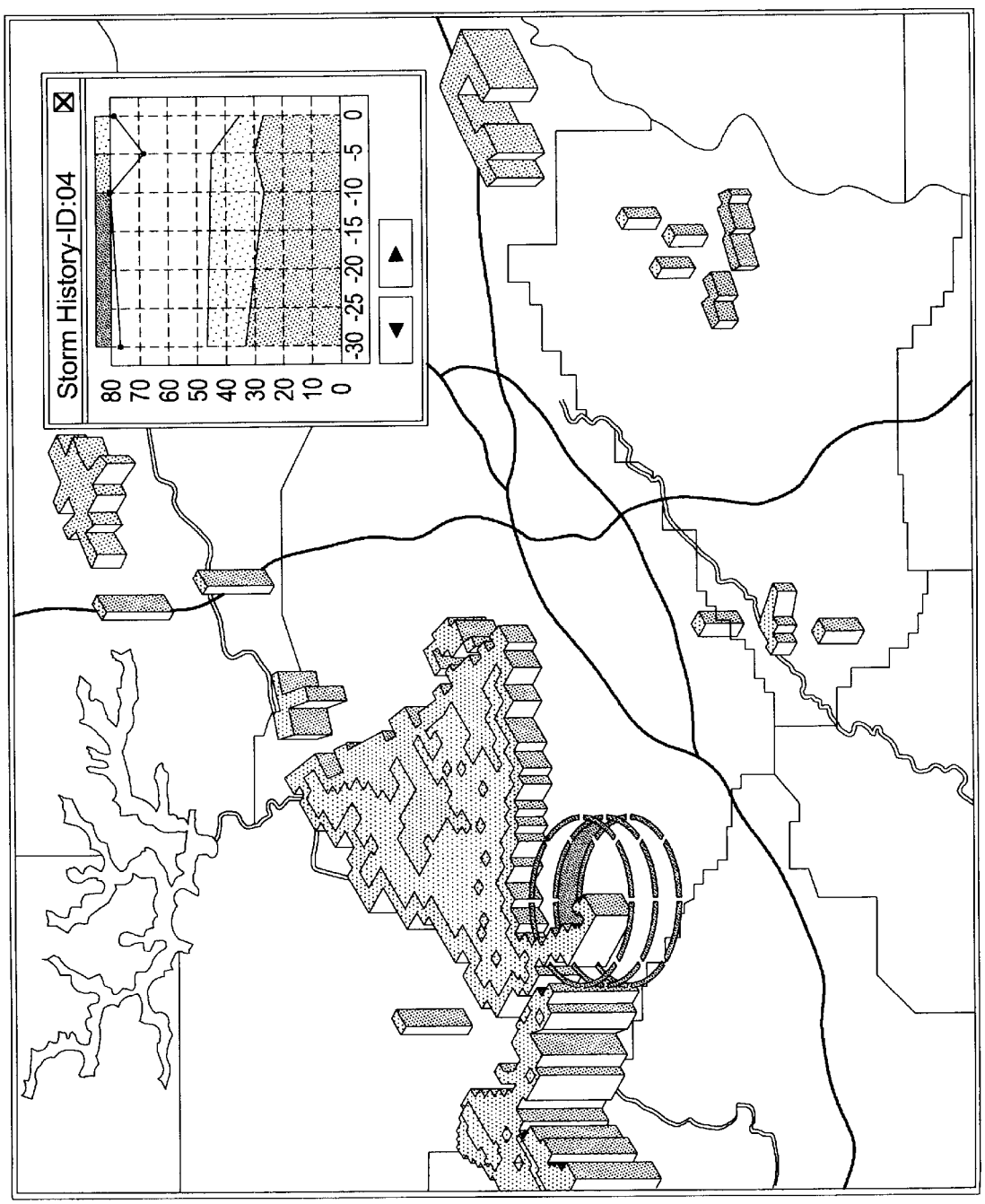
FIG. 4 is an example of a three-dimensional graphical display prepared utilizing the present invention.

Referring to the drawings by reference numerals, there is shown in block diagram in FIG. 1, the basic stages of obtaining and processing weather data in accordance with the present method. FIG. 2 illustrates the major components of the system, and FIG. 3 illustrates schematically the fusing of the NEXRAD) data with real-time Doppler radar data.

The present system incorporates five stages for obtaining and processing the weather data; (1) geographical data creation and storage 10, (2) meteorological data acquisition 20, (3) process and combine the meteorological data 30, (4) creation of 3-D graphical representation of weather display 40, and (5) combine weather display with geographic data 50.

Referring to FIG. 2, the components utilized in the invention are shown. In the first stage 10, geographical data of a pre-determined geographical area may be compiled and stored in fixed memory by microprocessor 15 and is accessed and retrieved as needed while the system is in use. In the preferred embodiment, a detailed map of the selected area is stored which includes state and county boundary information, landmarks, waterways, and even detailed street maps of the entire area. This allows the viewer to quickly recognize the geographic area, and allows the system to have a "zoom-in" feature that displays information down to street level.

In the second stage 20, meteorological data is obtained in real-time using Doppler radar units 21 operated from at least one location and in conjunction with NEXRAD data 23. Ancillary meteorological data 24, such as cloud height, temperature, humidity, and dew point, total rainfall and satellite imagery may be obtained by non-radar measurements.

The preferred Doppler radar units 21 are C-band or X-band Doppler meteorological surveillance radar with automatic computer processing systems 22 and ground clutter suppression. These radar units provide measurement of both reflectivity and velocity of rain droplets and can scan volumetrically to produce high-quality images. In the reflectivity mode, the rain droplet echoes are scaled to correspond directly to values of rainfall intensity or rainwater content. In velocity mode, the radar measures the movement of scattering particles along the radar beam. In addition, special lightning detection software and algorithms may be incorporated with the C-band radar to forecast lightning hazards. The radar automatic computer processing system 22 handles radar control, user interface and real-time display tasks. Base parameters, such as mean velocity, reflectivity and spectral width can be automatically displayed and archived on disk. The radar computer processing system 22 also allows playback capability for off-line analysis.

The data supplied by the C-band, and/or X-band radar units may be supplemented by S-band radar data 23 supplied by National Weather Service radar units to provide a picture of the weather in a radius of 250 nautical miles surrounding the installation. The National Weather Service has a network of advanced S-Band Doppler radar stations in place at 138 sites in the United States, and is capable of delivering 77 different data products to government meteorologists. The data products include; winds aloft, lightning activity and wind shear conditions such as microburst activity. Out of these 77 products, 11 are allowed to be received by the public which include four tilts or "slices" of the atmosphere in clear air mode and eleven slices of the atmosphere in storm mode.

The various slices of the atmosphere create a time delay in the acquisition of NEXRAD data. The NEXRAD radar first provides weather data for the lowest slice of the atmosphere. Then the angle of the radar relative to the ground is increased, and data is collected and transmitted for the next slice of the atmosphere. This process continues until the radar has collected data for each slice of the atmosphere. During this rotation, only one slice of the atmosphere is updated at a time, and thus the data for the remaining slices remain static until the radar returns to that part of the rotation. For example, if the data for the slice of the atmosphere lowest to the ground is collected and translated at 12:00, it will not be updated until about 12:05. This delay in data causes a problem in attempting to combine the data with real-time Doppler data.

The 11 data products from the National Weather Service are commercially available through private weather service companies, called "NIDS vendors" which act as intermediaries between the National Weather Service and the public. The acquisition of the 11 data products at a particular site requires a downlink microwave unit and file server.

In the preferred embodiment, the present system would utilize the following National Weather Service data products to supplement the C-band and X-band radar data:

| Product # | Product ID | Product |
|---|---|---|
| 19 | R | Reflectivity (4 lowest tilts) |
|  | CR | Composite reflectivity |
| 36 | CR | Clear air mode |
| 38 | CR | Precipitation mode |
| 41 | ET | Echo tops |
| 57 | VIL | Vertical integrated liquid |
| 78 | OHP | Surface rainfall accumulation/ 1 hr running total |
| 79 | THP | Surface rainfall accumulation/ 3 hr total |
| 80 | STP | Surface rainfall accumulation/ Storm total |
| 81 | DPA | Hourly digital rainfall array product |
| 27 | V | Radial velocity (4 lowest tilts) |
| 48 | VWP | Velocity azimuth display (VAD) winds (time vs height) Layer composite reflectivity |
| 65 | LRM | Low layer |
| 66 | LRM | Middle layer |
| 90 | LRM | High layer |
| 75 | FTM | Free text message (instrumentation messages) |

The time delay problem that exists in combining real-time Doppler and NEXRAD data exists to a certain extent with other types of weather data inputs. For example, lightening strike data does not come in continuously but is recorded every second. Various other types of surface data inputs are available in a wide variety of time increments.

The desired weather data is transmitted via various communication lines to a microprocessor 15 that uses algorithms to translate this data into weather information that is useful to the viewer. The processes useful for translating this information are well known to those of skill in the art, however, those of skill have not generally needed to compile this information in three dimensions. Those of skill in the art will recognize, however, that the collected data may be separated and utilized according to height, as well as the familiar two dimensions that are commonly used. The microprocessor 15 used to compile the weather data and the computer 26 used to create the graphical display may actually exist in the same unit. The preferred microprocessor 15 for this system is a dual Pentium® processor platform.

In the third stage of the process 30, the Doppler radar and NEXRAD data are combined to provide a complete picture of current weather data. This is accomplished through a process of constantly adding data to the graphical representation, as it becomes available, and periodically updating the data to provide an accurate picture as of the time of the update.

The radar data may first be converted from the radial coordinates in which it is received, to Cartesian coordinates for easier 3D representation. Any other weather data that is received should also be converted to similar Cartesian coordinates to be filled into the area displayed. A unique feature of the present invention is the utilization of height data with respect to the weather data displayed. Previously, weather data has been displayed from a direct overhead view, so that only two dimension characteristics were necessary. The user could display the intensity and nature of a given storm cell, but only with respect to its geographic location, not with respect to the storm's height in the atmosphere. The present invention provides for the display of full volumetric information of the weather in a given geographic area.

Next, the data may be processed to provide a graphical representation of the current weather. The methods for converting real-time Doppler radar and NEXRAD data into graphical weather displays are well known by those of skill in the art of computerized weather-casting. The precipitation and velocity information are utilized to define the location and intensity of storm cells, as well as the existence of wind shear and other important weather factors. Although weather is not generally displayed with three-dimensional graphics, the methods for creating 3D displays once all of the data points have been determined are well known.

The fourth step 40 of the process is creating and updating a three-dimensional model of the current weather. FIG. 3 provides a graphical representation of the three-dimensional area to be illustrated once the weather data has been processed. The grid pattern 42 is illustrative of the geographic data stored in the computer memory, and provides the "x" and "y" axes of the Cartesian coordinates. The box 44 is illustrative of the atmosphere above the geographic area for which the weather data is collected, which provides the "z" axis. The Cartesian coordinates of the converted weather data correspond to coordinates within this box 44.

The three-dimensional model of the weather data may be created by using data from recent past. If data has been collected and time tagged, then a full three-dimensional model of the weather within the geographic area may be built based upon the old data. Alternatively, the model may be developed without the use of saved data, by building the three-dimensional model as weather data becomes available. The model may be updated by defining a periodic update period, or "heartbeat," for the data system. The inventors have determined that a five-minute "heartbeat" is preferable for present day methods of collecting weather data. As weather data collection techniques become more advanced, the preferred system heartbeat will likely be more rapid. Data is collected from all of the desired weather data sources during the five-minute period. The three-dimensional display is constantly updated with the available information. At the end of the five-minute period, all of the desired weather data sources will have reported data, and the entire three-dimensional display can be completed based upon the full collection of data. The system then once again begins updating the display in preparation for the next heartbeat.

The periodic update period may best be explained with reference to the three-dimensional weather box shown in FIG. 3. Any weather passing through the box will be displayed. As weather data is collected, it is immediately processed and then utilized to update the weather display. During the five-minute heartbeat period, the real-time Doppler radar data is constantly updated as the radar rotates. However, as stated above, the NEXRAD data is delivered in slices. As the data for the lowest slice of the atmosphere is collected, that portion of the display box is updated. As the next slice of atmosphere data is received, the new corresponding section of the display box is also updated. The lowest slice of atmosphere would remain primarily static, except for any changes that need to be made based upon the real-time Doppler radar data, or any other weather data input being utilized. In this way, the display box is constantly updated until the NEXRAD radar completes its cycle. At the end of the five-minute heartbeat period, the entire display box may be updated to match the compilation of weather data that has been collected during the preceding five-minutes. Then the process will begin all over again.

Although only one weather box is shown in FIG. 3, it should be recognized that the present invention may utilize multiple boxes to build the three dimensional weather display. If the geographic area is large enough, then multiple NEXRAD radar sites and/or Doppler radar sites may be used to cover the entire area. In such case the user may find the system more versatile if it is broken down into several boxes, each of which is updated at its own "heartbeat" pace.

In the final stage 50, the three-dimensional graphical representation of the combined weather data is combined with the geographical data for display in "real-time." "Real-time display" for purposes of the present system is defined as display within approximately 6 minutes of acquiring meteorological data. The graphical representation is displayed relative to a selective "observation point" and dynamically controlled with respect to geographical and topographical data by a peripheral device, such as a mouse. The storm data is represented in full volume form, meaning that data representing the interior of the storm may also displayed. This allows the user to rotate the storm cell and geographical data to view the storm from any angle. In addition the user may "slice" the storm to view its cross-section from any angle. The full volume graphical representation of the storm is well within the ordinary skill in the art, once the weather data has been collected and translated into Cartesian coordinates.

As shown in FIG. 1, the process of collecting, processing and displaying the weather data is preferably continuous. That is, the three-dimensional model of the weather is constantly updated so that new data is utilized as soon as it is received.

In a preferred embodiment of the present invention, storm cells will be displayed by showing only their exterior, with various color schemes utilized to represent precipitation intensities. One display option for the user will be showing the storm from directly overhead. This will make the storm appear to be in the more familiar two-dimensional display that television viewers currently recognize. The user may then tilt the storm upon its "x" axis, to begin giving the storm height in a perspective view (FIG. 5). In this way, the television viewers will recognize the size of the storm cell, and still be able to associate geographic landmarks with the storm.

Should a thunderstorm enter the area, the radar system will be able to actually produce a 3-D "x-ray" of the storm itself. Using simple graphical techniques, the different storm structures can be visualized based upon radar reflectivity. All areas can be easily represented: the updraft vault, wall cloud, rain zones, lightening strikes, and dangerous wind shear locations. The Doppler radar would be able to detect the characteristic "hook" shape associated with tornadic rotation many minutes before the tornadoes touch the ground. The observer will be able to visualize the information in 3-D.

Thus, broadcasters will be able to not only tell about storm activity, they will be able to show viewers—giving them a tour of the thunderstorm in real time. Suppose, for example, during a thunderstorm, circular motion begins to occur 1000 feet above the ground over the corner of Smith Street and Elm Drive. The broadcaster would have the raw data and be able to zoom in on the structure, examine it—and then warn viewers.

During a hurricane, the viewers will be able to "see" the structure of the storm on their television screen, then perhaps travel down into the eye and through the wall of the hurricane. Intense updrafts, vortices and tornadic activity can be identified through visualization of Doppler images. For the first time, viewers will actually see what is going on in the air above them.

Rainfall intensities can also be determined and modeled using layering techniques, thus giving important information on potential flooding. This same technique can be ported to another real-time problem associated with urban life: reporting and visualization of traffic tie-ups.

The present system provides exceptional data and graphics, far beyond what is now offered on television weathercasts.

While this invention has been described fully and completely with special emphasis upon a preferred embodiment, it should be understood that within the scope of the appended claims the invention may be practiced otherwise than as specifically described herein.

We claim:

1. A method of graphically displaying weather data in real-time, said method comprising the steps of:

receiving a plurality of subsets of weather data over a period of time, said plurality of subsets of weather data defining a detectable volume of a weather event affecting a geographic area, and each subset of said plurality of subsets defining a volumetric portion of the weather event;

processing each subset of weather data as each subset is received to create a plurality of components, each of said components corresponding to a particular volumetric portion of the weather event;

associating each component with a graphical representation of the affected geographic area as each component becomes available to create a then current three-dimensional model of the detectable volume of the weather event; and displaying a graphical representation of the then current three-dimensional model during the associating step such that a viewer observes the graphical representation changing a component at a time over the period of time.

2. The method of claim 1 wherein said associating step comprises the step of replacing a component of said three-dimensional model with an updated component when an updated subset of weather data is received.

3. The method of claim 1 wherein said associating step comprises the step of successively replacing each component of said three-dimensional model with a corresponding updated component as updated subsets of weather data are received.

4. The method of claim 1 wherein said associating step comprises the step of adding a component to the then current three-dimensional model when an additional subset of weather data is received.

5. The method of claim 1 wherein said receiving step comprises the step of receiving said plurality of subsets of weather data from a plurality of sources.

6. The method of claim 5 wherein said plurality of sources comprises NEXRAD radar data and at least one real-time Doppler radar, and wherein said associating step comprises the steps of continuously replacing said component corresponding to said real-time doppler radar and replacing each component corresponding to said NEXRAD radar data as each component becomes available.

7. The method of claim 1 wherein said displaying step comprises the step of depicting said graphical representation in two-dimensions.

8. The method of claim 1 wherein said displaying step comprises the step of depicting said graphical representation in three-dimensions.

9. The method of claim 1 wherein the period of time is less than or equal to six minutes, and wherein said associating step comprises the step of adding each component to the graphical representation within the period of time.

10. The method of claim 1 wherein the period of time is less than or equal to six minutes, and wherein said associating step comprises the step of replacing each component of said three-dimensional model with an updated component within the period of time.

11. A system for graphically displaying weather data in real-time, said system comprising:

a source of weather data, said source of weather data configured to deliver a plurality of subsets of weather data over a period of time, the plurality of subsets defining a detectable volume of a weather event affecting a geographic area, and each subset defining a volumetric portion of the weather event;

a database including a graphical representation of the geographic area;

a processor communicating with said source of weather data to receive the plurality of subsets of weather data, said processor instructed to process each subset of weather data at the time each subset is received to create a plurality of components, each of which corresponds to a particular volumetric portion of the weather event, and communicating with said database to associate each component with the graphical representation of the geographic area as each component becomes available such that a then current three-dimensional model of the detectable volume of the weather event is derived over the period of time; and a display device communicating with said processor to graphically depict the association of each component with the graphical representation such that a viewer observes the graphical representation of the three-dimensional model changing a component at a time over the period of time.

12. The system of claim 11 wherein said source of weather data comprises a plurality of sources of weather data.

13. The system of claim 12 wherein said plurality of sources of weather data comprise at least one NEXRAD radar and at least one real-time Doppler radar.

14. The system of claim 13 wherein said real-time Doppler radar continuously delivers a subset of weather data and said NEXRAD radar delivers a plurality of subsets of weather data a subset at a time over a period of time, and wherein said processor continuously replaces the component corresponding to the real-time Doppler radar and replaces each component corresponding the NEXRAD radar as each component becomes available.

15. The system of claim 12 wherein said plurality of sources are selected from the group consisting of C-band, S-band or X-band radar.

16. The system of claim 11 wherein the graphical representation of the three-dimensional model is depicted in two dimensions.

17. The system of claim 11 wherein the graphical representation of the three-dimensional model is depicted in three dimensions.

18. The system of claim 11 wherein the period of time is less than or equal to six minutes, and wherein each component of said plurality of said received components is added to the graphical representation within the period of time.

19. The system of claim 11 wherein the period of time is less than or equal to six minutes, and wherein each component of the graphical representation is replaced with an updated component within the period of time.

* * * * *